(12) United States Patent
Vishnia

(10) Patent No.: US 10,477,841 B2
(45) Date of Patent: Nov. 19, 2019

(54) METHOD AND DEVICE SUITABLE FOR INCUBATING AVIAN EGGS

(71) Applicant: David Vishnia, Raanana (IL)

(72) Inventor: David Vishnia, Raanana (IL)

( * ) Notice: Subject to any disclaimer, the term of this patent is extended or adjusted under 35 U.S.C. 154(b) by 298 days.

(21) Appl. No.: 15/301,389

(22) PCT Filed: Apr. 14, 2015

(86) PCT No.: PCT/IB2015/052699
§ 371 (c)(1),
(2) Date: Oct. 2, 2016

(87) PCT Pub. No.: WO2015/159210
PCT Pub. Date: Oct. 22, 2015

(65) Prior Publication Data
US 2017/0020114 A1    Jan. 26, 2017

(30) Foreign Application Priority Data
Apr. 14, 2014    (GB) .................................. 1406641.9

(51) Int. Cl.
*A01K 41/02*    (2006.01)
(52) U.S. Cl.
CPC .................... *A01K 41/023* (2013.01)
(58) Field of Classification Search
CPC ................................................... A01K 41/023
See application file for complete search history.

(56) References Cited

U.S. PATENT DOCUMENTS

| 5,226,385 | A | * | 7/1993 | Cannon | ................... | A01K 41/02 |
|---|---|---|---|---|---|---|
| | | | | | | 119/300 |
| 5,657,720 | A | * | 8/1997 | Walters | ................... | A01K 41/00 |
| | | | | | | 119/317 |

(Continued)

FOREIGN PATENT DOCUMENTS

| CN | 102318580 | 1/2012 |
|---|---|---|
| RU | 2070387 | 12/1996 |

(Continued)

OTHER PUBLICATIONS

UK Intellectual Property Office Search and Examination Report for Application GB1406641.9, dated Jun. 4, 2014.

(Continued)

*Primary Examiner* — Magdalena Topolski
(74) *Attorney, Agent, or Firm* — The Law Office of Joseph L. Felber

(57) ABSTRACT

A method for incubating avian eggs, comprising: a. introducing avian eggs into an incubation chamber having an oxygen-containing atmosphere; b. subsequent to 'a', incubating said eggs in said incubation chamber for a period of time that is not less than 25% of the natural incubation period of said eggs; c. during said period of time of the incubating, changing an orientation of said eggs at a frequency of not less than once every two days; and d. during said period of time of said incubating, varying a temperature of said atmosphere in said incubation chamber at a frequency of not less than five times a day, the varying comprising: increasing the temperature of the atmosphere from a first temperature to a second temperature, the difference between the first temperature and the second temperature being not less than 1.0° C.; and reducing the temperature from the second temperature to a third temperature, the difference between the second temperature and the third temperature being not less than 1.0° C. wherein the rate of said increasing the temperature of the atmosphere is not (Continued)

greater than 0.9°/5 minutes; and the rate of said reducing the temperature of the atmosphere is not greater than 0.9°/5 minutes.

13 Claims, 2 Drawing Sheets

(56) References Cited

U.S. PATENT DOCUMENTS

| | | | | |
|---|---|---|---|---|
| 5,865,142 | A * | 2/1999 | Chang | A01K 41/00 |
| | | | | 119/318 |
| 7,861,673 | B2 * | 1/2011 | Huisinga | A01K 45/005 |
| | | | | 119/300 |
| 8,826,860 | B2 * | 9/2014 | Meter | A01K 41/00 |
| | | | | 119/300 |
| 10,088,183 | B2 * | 10/2018 | Meter | A01K 41/023 |
| 2018/0271067 | A1 * | 9/2018 | Grajcar | A01K 45/007 |

FOREIGN PATENT DOCUMENTS

| | | |
|---|---|---|
| RU | 2490881 | 8/2013 |
| SU | 1327861 | 12/1985 |
| UA | 75941 | 6/2006 |

OTHER PUBLICATIONS

Yalcin et al., Manipulation of Incubation Temperatures to Increase Cold Resistance of Broilers: Influence on Embryo Development, Organ Weights, Hormones and Body Compositions, Journal of Poultry Science. vol. 49, pp. 133-130, 2012.

International Preliminary Report on Patentability for PCT/IB2015/052699, dated Oct. 18, 2016.

* cited by examiner

METHOD AND DEVICE SUITABLE FOR INCUBATING AVIAN EGGS

RELATED APPLICATION

The present application gains priority from UK patent application GB1406641.9 filed 14 Apr. 2014, which is included by reference as if fully set-forth herein.

FIELD AND BACKGROUND OF THE INVENTION

The invention, in some embodiments, relates to the field of agriculture, and more particularly, but not exclusively, to methods and devices suitable for incubating eggs for poultry farming.

Poultry farming, raising birds for meat and eggs, is an important industry. Bird species raised in poultry farming include chicken, turkey, duck, goose, quail, pheasant, pigeon (including doves), partridges and to a lesser extent ostrich. Worldwide, more than 50 billion chickens are raised annually for meat and eggs.

A first step in poultry farming involves producing chicks by incubating fertilized eggs in an incubator until the eggs hatch. It is accepted that up to 90% of eggs placed in an industrial incubator are actually fertile.

It is accepted in the art that the highest hatch rate (the proportion of fertile eggs that hatch and give viable chicks) in industrial incubators is achieved when the eggs are maintained at a stable and constant temperature. For instance, it is accepted that in an industrial incubator, variations of more than 0.1° C. from the optimal 37.5° C. will reduce hatch rates. Accordingly, industrial incubators are maintained at 37.5°±0.1 C during the incubation process. Furthermore, it is known in the art that to prevent embryos from adhering to the internal egg walls and developing defects, the eggs must be moved during incubation. In industrial incubators, the eggs are periodically tilted through +45".

During optimal incubation, eggs lose between 13% and 17% weight, primarily due to water loss by evaporation through the eggshell. The rate of weight loss is dependent on factors such as incubation temperature, relative humidity and eggshell thickness that depend, inter alia, on the species and diet of the laying hen. During incubation using industrial incubators, it is known to weigh a sample of eggs every few days and compare the average weight loss of the sampled eggs to a known graph of weight loss as a function of incubation time. Deviations are corrected by changing the relative humidity of the atmosphere in the incubator, i.e., increasing the relative humidity if the average weight is too low indicating that the rate of water evaporation from the eggs is too high and decreasing the relative humidity if the average weight is too high indicating that the rate of water evaporation from the eggs is too low.

It has been found that under ideal conditions of temperature, movement and adjusting humidity based on weight-loss monitoring, less than 90% of the up to 90% fertile eggs hatch to yield a viable chick.

The present Inventor has previously developed a small-scale incubator (having a capacity of up to about 50 parrot eggs) commercially sold as the Inca Incubator. Although originally designed for incubating parrot eggs, the incubator has been used with great success for incubating eggs of all species, for example, falcons and hummingbirds.

In the Inca incubator, the eggs rest on the floor of the incubator between movable rods. During incubation, the atmosphere in the incubator is maintained at 37.5±1° C., while the temperature of the floor on which the eggs rest is lower, typically 35.0-35.5° C. Every 60 to 90 minutes, the rods are moved, rolling the eggs to achieve rotation around the egg axis of between about 160° and about 220°. Like in industrial incubators, the weight loss of the incubating eggs is monitored and humidity is adjusted to keep the rate of weight loss within the accepted values.

The Inca incubators have been found to have a close to 100% hatch rate of fertilized eggs. Without wishing to be held to any one theory, it is believed that a reason for such a high hatch rate is a result of emulating natural incubation by brooding birds: the egg resting on a surface cooler than the incubator atmosphere leads to a temperature gradient across the egg throughout the incubation period emulating natural incubation where the portion of an egg resting at the bottom of a nest is cooler than the portion in contact with the brooding adult's body leading to a temperature gradient across the egg while the intermittent rolling of around 180° mimics the intermittent rotation of the eggs by the adult bird.

Methods and devices for incubating avian eggs, especially on an industrial scale, are sought after.

SUMMARY OF THE INVENTION

Some embodiments of the invention herein provide methods and devices for incubating avian eggs, that are in some aspects advantageous over those known in the art.

According to an aspect of some embodiments of the invention, there is provided a method for incubating avian eggs, comprising:

a. introducing avian eggs into an incubation chamber having an oxygen-containing atmosphere;

b. subsequent to a, incubating the eggs in the incubation chamber for a period of time that is not less than 25% of the natural incubation period of the eggs;

c. during the period of time of the incubating, changing an orientation of the eggs at a frequency of not less than once every two days; and d. during the period of time of the incubating, varying a temperature of the atmosphere in the incubation chamber at a frequency of not less than five times a day, the varying comprising:

increasing the temperature of the atmosphere from a first temperature to a second temperature, the difference between the first temperature and the second temperature being not less than 10° C.; and reducing the temperature from the second temperature to a third temperature, the difference between the second temperature and the third temperature being not less than 1.0° C.

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise. As used herein, when a numerical value is preceded by the term "about", the term "about" is intended to indicate +/−10%. As used herein, when a temperature value is given, it is understood to mean±0.1° C., for example, 37° C. means 37°±0.1° C. As used herein, when a value for a temperature difference is given, it is understood to mean±0.2° C., for example, a temperature difference of 5° C. means a difference of 5°±0.2° C.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or oscilloscopes. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1:
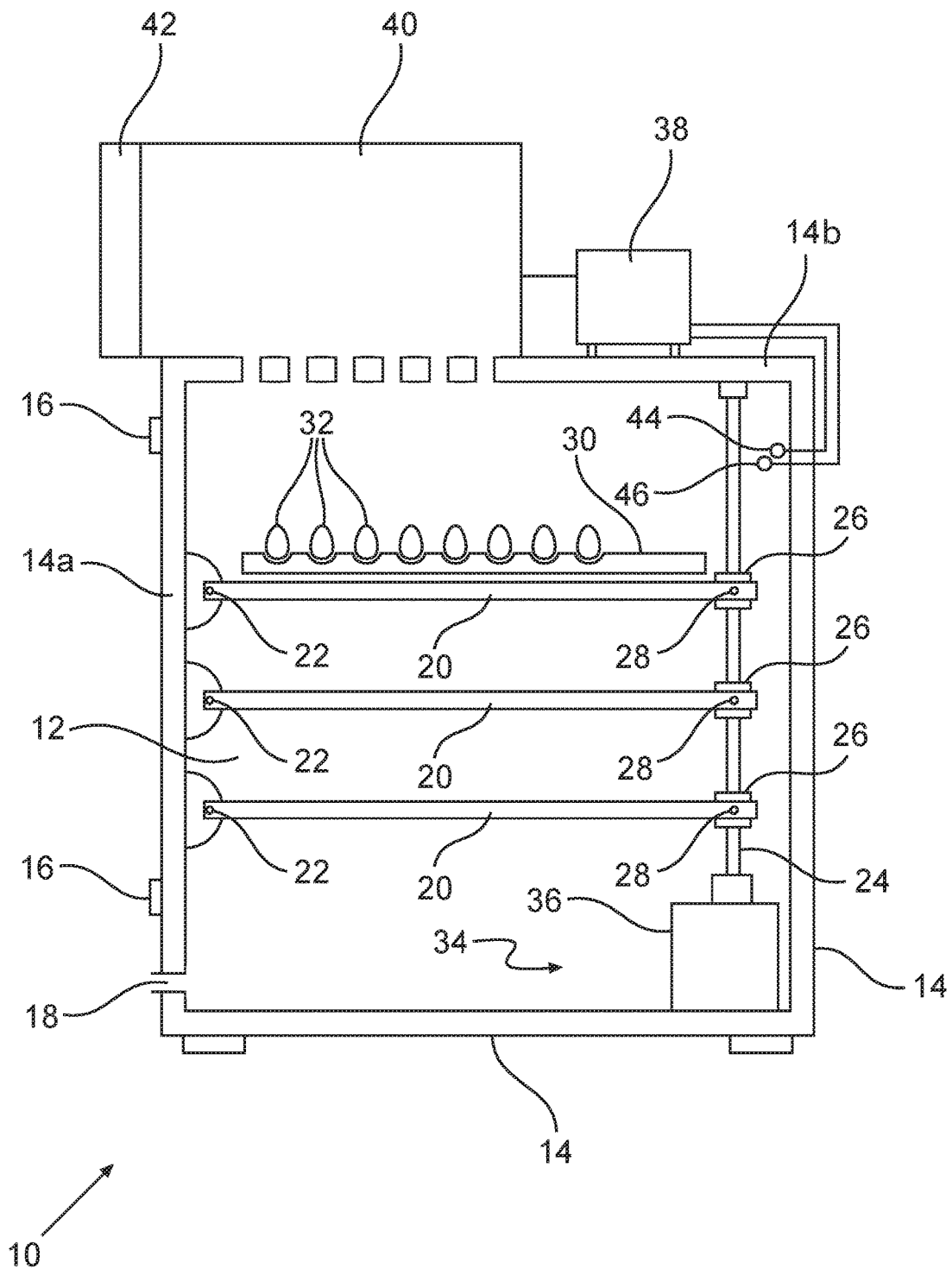
FIG. 1 schematically depicts a first embodiment of an incubating device according to the teachings herein, in perspective.

The invention, in some embodiments thereof, relates to methods and devices suitable for incubating avian eggs, that are in some aspects advantageous over those known in the art.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As noted in the background above, the hatch rate of eggs incubated in industrial incubators is typically less than 90% of fertile eggs.

As noted above, the present Inventor previously invented a small-scale incubator that consistently provides a much higher hatch rate than known industrial incubators, presumably by emulating the natural incubation process. Specifically, eggs rest on a surface cooler than the incubator atmosphere that is maintained at a constant "ideal" temperature. The eggs are intermittently rolled on the lower surface of the incubator, so that there is always a temperature-gradient generated across the width of the egg, that changes direction as a result of the rolling.

Despite the high incubation rate of the Inca, modifying such an incubator to an industrial scale is not practical as it requires placing, monitoring and later gathering chicks from thousands, tens-of-thousands and even greater than hundreds of thousands of eggs on the floor of a large-scale incubator.

Herein are taught incubation methods and devices that in some embodiments are suitable for industrial scale incubation of avian eggs. In some embodiments of the teachings herein, the temperature of the atmosphere in which the eggs are incubated is varied over the course of the day. Unlike the Inca incubator, such varying of temperature does not ensure that there is a temperature gradient across the width of the egg throughout the incubation period. Despite the lack of a substantial temperature gradient across the width of the egg throughout the incubation period, there is an unexpected improvement of incubation rate.

Method for Incubating Avian Eggs

Thus according to an aspect of some embodiments of the teachings herein, there is provided a method for incubating avian eggs, comprising:

a. introducing avian eggs into an incubation chamber having an oxygen-containing atmosphere;
b. subsequent to a, incubating the eggs in the incubation chamber for a period of time that is not less than 25% of the natural incubation period of the eggs;
c. during the period of time of the incubating, changing an orientation of the eggs at a frequency of not less than once every two days; and
d. during the period of time of the incubating, varying the temperature of the atmosphere in the incubation chamber at a frequency of not less than five times a day, the varying comprising:

increasing the temperature of the atmosphere from a first temperature to a second temperature, the difference between the first temperature and the second temperature being not less than 1.0° C.; and reducing the temperature from the second temperature to a third temperature, the difference between the second temperature and the third temperature being not less than 1.0° C.

In some embodiments, the rate of the increasing the temperature of the atmosphere and decreasing the temperature of the atmosphere is sufficiently slow so as to avoid creating a substantial temperature gradient within the eggs (excluding any incidental temperature gradients caused during typical maintenance and/or handling/inspection of the eggs).

In some embodiments, the rate of the increasing the temperature of the atmosphere is not greater than 0.9°/5 minutes; and the rate of the reducing the temperature of the atmosphere is not greater than 0.9°/5 minutes excluding incidental higher rates caused during typical maintenance and/or handling/inspection of the eggs).

The teachings herein are applicable to avian eggs of any species of bird. In some embodiments, the avian eggs are of a species of bird selected from the group consisting of chicken (incubation period typically 21-23 days), turkey (incubation period typically 28 days), goose (incubation period typically 25-30 days), duck (incubation period typically 27-28 days), quail (incubation period typically 16-21 days), pigeon (including doves, incubation period typically 10-18 days), partridge (incubation period typically 23-24 days), pheasant (incubation period typically 20-30 days, depends on the species) and ostrich (incubation period typically 35-45 days).

For incubation, the eggs are typically held in an incubation chamber, e.g., the inner volume of a box or room, in typical embodiments an insulated and/or closed and/or sealed box or room. Typically the eggs are held in the incubation chamber separated one from the other in a series and/or stack of egg racks. The egg racks are made of any suitable material, typically of metal, wood or wood product (e.g., plywood, molded wood pulp), paper or paper product (e.g., cardboard, molded paper pulp) or plastic (e.g., foamed plastics, clear plastics, polystyrene, polyethylene, polypropylene, polycarbonate, PVC).

The atmosphere is any suitable oxygen-containing atmosphere. For practical reasons, the oxygen-containing atmosphere is typically air.

Period of Time

The eggs are incubated in the incubation chamber for a period of time that is not less than 25% of the natural incubation period of the eggs, where during the period of time the orientation of the eggs is changed at a frequency of not less than once every two days and the temperature of the atmosphere in the incubation chamber is varied at a frequency of not less than five times a day. During the period of time, there may be intermittent or periodic non-substantial changes to the atmosphere and orientation changing due to such events as periodic handling/inspection of the eggs and maintenance as known in the art of egg incubation.

In some embodiments, the period of time is not less than 50%, not less than 66%, not less than 75%, and in some embodiments, even not less than 85% of the natural incubation period of the eggs.

Frequency of Variation of the Temperature

As noted above, in some embodiments the varying of the temperature comprising, a heating event from a first temperature to a second temperature, followed by a cooling event from the second temperature to a third temperature) of the atmosphere in the incubation chamber is at a frequency of not less than five times a day. In some embodiments, the varying the temperature of the atmosphere in the incubation chamber is at a frequency of not less than seven, not less than eight, not less than nine and in some embodiments even not less than ten times a day.

In some embodiments, the varying the temperature of the atmosphere in the incubation chamber is at a frequency of not more than thirty, not more than twenty-eight, not more than twenty-six and in some embodiments even not more than twenty-four times a day. In some embodiments, the varying the temperature of the atmosphere in the incubation chamber is at a frequency of not less than ten times a day and not more than twenty-four times a day.

Changing Orientation

As known in the art, it is important to change the orientation of incubating eggs to avoid the embryo adhering to the egg wall and/or developing defects.

In some embodiments of the teachings herein, during the period of time of the incubating, the orientation of the eggs is changed at a frequency of not less than once every two days, preferably at a frequency not less than once a day. The specific details of how the orientation of the eggs are changed both in terms of mechanism and in terms of parameters (e.g., rate, frequency, duration of each orientation-changing event, and the like) are embodiment-dependent, but typically are similar or identical to those known in the art of industrial-scale incubation.

In some embodiments, the changing of the orientation of the eggs is substantially continuous, that is to say, the eggs are substantially continuously subject to orientation-changing motion, although typically with incidental stopping of the motion to allow maintenance and/or handling/inspection of the eggs.

In some embodiments, the changing of orientation of the eggs is discontinuous, comprising orientation-changing events of a duration during which the orientation of the eggs is changed, separated by rest periods during which the orientation of the eggs is not changed. In some such embodiments, the changing of the orientation of the eggs is periodic, having orientation-changing events of regular durations at regular intervals.

In some such embodiments, there is not less than one orientation-changing event every 24 hours, not less than one orientation-changing event every 12 hours, not less than once every 8 hours, not less than once every 4 hours and in some embodiments, not less than one orientation-changing event every 2 hours. That said, in some preferred embodiments, there is an orientation changing event every 90 minutes.

In some such embodiments, each orientation-changing event has a duration of not more than about 2 hours, not more than about 1 hour, not more than about 30 minutes, not more than about 15 minutes and even not more than about 5 minutes.

In some embodiments, each orientation-changing event has a duration of not less than about 10 seconds, not less than about 20 seconds and even not less than about 60 seconds.

In some embodiments, the changing of the orientation of the eggs is by tilting the eggs back and forth (e.g., the eggs are held in an egg rack, and the egg rack is tilted thereby tilting the eggs). In such embodiments, any suitable degree of tilting may be used. In some embodiments, the changing of the orientation comprises tilting the eggs back and forth through an arc of not less than about 20°, not less than about 40°, not less than about 60° and in some embodiments not less than about 90°.

In some embodiments, the changing of the orientation of the eggs is by rotating the eggs around an axis (e.g., the eggs are held in an egg rack resting on rotatable rollers, and the eggs rotated by rotating the rollers' in some embodiments in a single direction (clockwise or counterclockwise and in some embodiments sometimes clockwise and sometimes counterclockwise). In some such embodiments where changing orientation is discontinuous, in a given orientation-changing event the eggs are rotated by not less than about 20°, not less than about 60°, not less than about 90°, not less than about 120°, not less than about 170°, not less than about 240°, and in some embodiments not less than about 360°.

In some preferred embodiments changing the orientation comprises tilting the eggs back and forth through an arc of about 90° (e.g., +45° to −45° or −45° to +45°), for example, discontinuously with an orientation-changing event every 90 minutes, each orientation-changing event having a duration of about 5 minutes.

Temperature

As noted above, an aspect of some embodiments of the teachings herein is that during the period of time of the incubating, the temperature of the atmosphere in the incubation chamber is varied at a frequency of not less than five times a day, the varying comprising: increasing the temperature of the atmosphere from a first temperature to a second temperature, the difference between the first temperature and the second temperature being not less than 1.0° C.; and subsequently reducing the temperature from the second temperature to a third temperature, the difference between the second temperature and the third temperature being not less than 1.0° C. That said, typically during the period of time of the incubating, there are incidental substantial changes in the temperature that occur during maintenance and/or handling/inspection of the eggs.

In some embodiments, the first temperature is the same in every temperature variation cycle (a single temperature variation cycle being a time period that includes a single change in temperature from a first temperature to a second temperature and from a second temperature to a third temperature). In some embodiments, the first temperature of one temperature variation cycle is optionally different from the first temperature of a preceding temperature variation cycle. Typically, the first temperature of one temperature variation cycle is the third temperature of a preceding temperature variation cycle.

In some embodiments, the first temperature and the third temperature of a given temperature variation cycle are the same. In some embodiments, the first temperature and the third temperature of a given temperature variation cycle are optionally different.

In some embodiments, the second temperature is the same in every temperature variation cycle. In some embodiments, the second temperature of one temperature variation cycle is optionally different from the second temperature of a preceding temperature variation cycle.

In some embodiments, the first temperature, the second temperature and the third temperature are the same in every temperature variation cycle. In some embodiments, the first temperature of one temperature variation cycle is the same as the first temperature of a following temperature variation cycle, but the second temperature of the temperature variation cycle is optionally different from the second temperature of the following temperature variation cycle. In some embodiments, the first temperature of one temperature variation cycle is optionally different from the first temperature of a following temperature variation cycle, but the second temperature of the temperature variation cycle is the same as the second temperature of the following temperature variation cycle. In some embodiments, the first temperature of one temperature variation cycle is optionally different from the first temperature of a following temperature variation cycle, and the second temperature of the temperature variation cycle is optionally different from the second temperature of the following temperature variation cycle.

In some embodiments, the reducing of the temperature to the third temperature commences within not more than 1 minute of attaining the second temperature.

In some embodiments, the reducing of the temperature to the third temperature commences after a substantial rest period subsequent to attaining the second temperature, the rest period having a duration of not less than 1 minute. Such a rest period allows the temperature inside the egg further from the eggshell to approach or be equal to the temperature of the atmosphere and helps prevent formation of a substantial temperature gradient inside the egg. In some embodiments, such a rest period has a duration of not less than 2 minutes, not less than 5 minutes, not less than 10 minutes and even not less than 15 minutes. In some such embodiments, during such a rest period the temperature of the atmosphere is maintained within ±0.5°, ±0.4°, ±0.3° and even ±0.2° of the second temperature.

In some embodiments, the increasing of the temperature to the second temperature commences after a substantial rest period subsequent to attaining the first temperature, the rest period having a duration of not less than 1 minute. Such a rest period may have the advantage discussed above. In some embodiments, such a rest period has a duration of not less than 2 minutes, not less than 5 minutes, not less than 10 minutes and even not less than 15 minutes. In some such embodiments, during the rest period the temperature of the atmosphere is maintained within ±0.5°, ±0.4°, ±0.3° and even ±0.2° of the first temperature.

The average temperature of the atmosphere in the incubation chamber during the period of time of the incubating is any suitable average temperature. In some embodiments, the average temperature is not less than 36.5° C. and not more than 38.5° C. in some preferred embodiments, the average temperature is not less than 37.0° C. and not more than 38.0° C.

In some embodiments, the temperature difference between a first temperature and a following second temperature is not less than 1.5° C., not less than 2° C., not less than 2.5° C., not less than 3° C., not less than 4° C., and even not less than 5° C.

In some embodiments, the temperature difference between a first temperature and a following second temperature of the atmosphere in the incubation chamber is not more than 5.5° C., not more than 5° C., not more than 4.5° C. and even not more than 3.5° C.

In some embodiments, the temperature difference between a second temperature and a following third temperature of the atmosphere in the incubation chamber is not less than 1.5° C., not less than 2° C., not less than 2.5° C., not less than 3° C., not less than 4° C. and even not less than 5° C.

In some embodiments, the temperature difference between a second temperature and a following third temperature of the atmosphere in the incubation chamber is not more than 5.5° C., not more than 5° C., not more than 4.5° C. and even not more than 3.5° C.

That said, in some preferred embodiments, the temperature difference between a first temperature and a following second temperature and the temperature difference between a second temperature and a following third temperature of the atmosphere in the incubation chamber is not less than 15° C. and not more than 5° C.; in some embodiments not less than 1.5° C. and not more than 4° C.; and in some embodiments even not less than 1.5° C. and not more than 35° C.

The second temperature is any suitable temperature. That said, typically the second temperature is less than a temperature at which the developing embryo is adversely affected, such as not greater than 42° C. and even not greater than 41° C. In some embodiments, the second temperature is not less than 37° C., not less than, 37.5° C., not less than 38° C. and even not less than 38.5° C. In some embodiments, the second temperature is not less than 37° C. and not greater than 40° C.; not less than 38° C. and not greater than 40° C.; not less than 38.5° C. and not greater than 395° C.; and in some embodiments even not less than 38.5° C. and not greater than 39° C. In some preferred embodiments, the second temperature is not less than 37.5° C. and not greater than 39° C.

The first temperature is any suitable temperature. That said, typically the first temperature is sufficient to maintain the rate of incubation of the developing embryo, such as not lower than 33° C. and even not lower than 34° C. In some embodiments, the first temperature is not greater than 37° C., not greater than 36.5° C., not greater than 36° C. and even not greater than 35.5° C. In some embodiments, the first temperature is not less than 34° C. and not greater than 37° C.; not less than 34.5° C. and not greater than 36.5° C.; and in some embodiments even not less than 35° C. and not greater than 36° C.

The third temperature is any suitable temperature. That said, typically the third temperature is sufficient to maintain the rate of incubation of the developing embryo, such as not lower than 33° C. and even not lower than 34° C. In some embodiments, the third temperature is not greater than 37° C., not greater than 36.5° C., not greater than 36° C. and even not greater than 355° C. In some embodiments, the third temperature is not less than 34° C. and not greater than 37° C., not less than 34.5° C. and not greater than 36.5° C.; and in some embodiments even not less than 35° C. and not greater than 36° C.

In some preferred embodiments, the first and third temperatures are not less than 35° C. and not greater than 35.5° C. and the second temperature is not less than 38.0° C. and not greater than 39° C.

As noted above, in industrial incubators the temperature of the atmosphere in the incubation chamber is maintained at a set temperature at an accuracy of ±0.1° C. In typical embodiments of the teachings herein, the accuracy of the temperature is not of critical importance. Accordingly, in some embodiments, a given temperature is maintained at an accuracy of not more accurate than ±0.2° C., not more accurate than ±0.3° C., not more accurate than ±0.4° C. and even not more accurate than ±0.5° C.

In some embodiments, the varying of the temperature of the atmosphere is substantially continuous, that is to say, the temperature is continuously varying from a first temperature to a higher second temperature or from a second temperature to a lower third temperature, although typically with incidental discontinuities to allow maintenance and/or handling/ inspection of the eggs.

For example, in some embodiments where the varying of the temperature is continuous, the temperature is varied cyclically (e.g., the temperature of the atmosphere as a function of time varies sinusoidally or as a triangle function) with heating (typically active heating) and passive or active cooling at appropriate portions of the cycle. In some such embodiments, the period (from highest temperature to highest temperature) of the temperature cycle is not less than 10 minutes, not less than 20 minutes, not less than 40 minutes, not less than 50 minutes, not less than 80 minutes, not less than 110 minutes, not less than 140 minutes, and even not less than 170 minutes. In some such embodiments, the period of the cycle is not more than 500 minutes, not more than 440 minutes, not more than 380 minutes, not more than 320 minutes, not more than 260 minutes, and even not more than 200 minutes.

In some preferred embodiments, the temperature of the atmosphere in the incubation chamber is varied sinusoidally with a period of 180 minutes by alternating active heating and active cooling from a first temperature not less than 35° C. and not greater than 35.5° C., to a second temperature not less than 38.5° C. and not greater than 39° C. to a third temperature not less than 35° C. and not greater than 35.5° C.

For example, in some embodiments where the varying of the temperature is continuous and the ambient temperature is appropriate (sufficiently cool), the temperature is actively increased from a first temperature to a second temperature, optionally actively maintained at the maximum temperature for a period of time, allowed to passively decrease to a third temperature, optionally actively maintained at the third temperature for a period of time, and then again actively increased. In some such embodiments, the period (from highest temperature to highest temperature) of the temperature cycle is not less than 10 minutes, not less than 20 minutes, not less than 40 minutes, not less than 50 minutes, not less than 80 minutes, not less than 110 minutes, not less than 140 minutes, and even not less than 170 minutes. In some such embodiments, the period of the cycle is not more than 500 minutes, not more than 440 minutes, not more than 380 minutes, not more than 320 minutes, not more than 260 minutes, and even not more than 200 minutes. In some such embodiments, the duration of heating (from the first temperature to the second temperature) during a single temperature variation cycle is not more than 50% of the temperature variation cycle, not more than 40% of the temperature variation cycle, not more than 30% of the temperature variation cycle and even not more than 20% of the temperature variation cycle.

In some embodiments, the varying of the temperature of the atmosphere is discontinuous, comprising temperature-varying events of a duration during which the temperature of the atmosphere is changed (actively cooled or passively allowed to cool from a second temperature to the lower third temperature, or actively warmed from the first temperature to the second temperature) separated by rest periods during which the temperature of the atmosphere is not varied but remains (in some embodiments, is actively maintained to be) substantially constant. Depending on the embodiment, in some embodiments by "substantially constant" is meant that the temperature of the atmosphere in the incubation chamber varies by not more than ±F, not more than ±0.8°, not more than ±0.6°, not more than ±0.5° and even by not more than ±0.4°). In some such embodiments, the changing of the temperature is periodic, having temperature-varying events of regular durations at regular intervals separated by rest periods.

In some such embodiments, there are not less than ten temperature-varying events every 24 hours (five pairs of: warming from a first temperature to a second temperature followed by cooling from the second temperature to a third temperature, each such pair making up a temperature varying cycle), not less than fourteen temperature-varying events every 24 hours (seven pairs), not less than sixteen temperature-varying events every 24 hours (eight pairs), not less than eighteen temperature-varying events every 24 hours (nine pairs and even not less than twenty temperature-varying events every 24 hours (ten pairs).

In some embodiments, each temperature-varying event has a duration of not more than 4 hours, not more than 2 hours, not more than 1 hour, not more than 30 minutes, not more than 15 minutes and even not more than 5 minutes.

In some embodiments, each temperature-varying event has a duration of not less than 5 seconds, not less than 10 seconds, not less than 30 seconds, not less than 45 seconds and even not less than 60 seconds.

The temperature of the atmosphere in the incubation chamber is varied in any suitable way. In some embodiments, the variation of the temperature of the atmosphere is performed so that the temperature of the atmosphere in the entire incubation chamber is substantially homogeneous with little or no temperature variation in the incubation chamber.

In some embodiments, the temperature of the atmosphere in the incubation chamber is varied by the use of heating and/or cooling elements located inside the incubation chamber. In some embodiments, the temperature of the atmosphere in the incubation chamber is varied by active introduction of air having a specified temperature into the incubation chamber. The temperature of the introduced air is controlled in any suitable way, for example using a standard or customized air conditioner. In some embodiments, the temperature of the introduced air is at the desired temperature for the atmosphere incubation temperature. In some embodiments, the temperature of the introduced air is gradually changed to the desired temperature for the atmosphere incubation temperature. In some embodiments, the rate of air introduction relative to the size of the incubation chamber is such that the temperature of the atmosphere in all of the incubation chamber is substantially homogeneous within not more than 1 minute, not more than 30 seconds, not more than 20 seconds and even not more than about 10 seconds.

Rate of Temperature Changes and Temperature Gradient in the Incubating Eggs

In accordance with some embodiments of the teachings herein, it is currently believed that to achieve superior hatching rates it is important not only to vary the temperature of the atmosphere in the incubation chamber at a frequency of not less than five times a day, but also to ensure that the rate of increasing the temperature and decreasing the temperature during the varying is relatively slow, for example, in some embodiments, not greater than 0.9°/5 minutes.

Without wishing to be held to any one theory, it is currently believed that the requirement that the rate of increasing the temperature and decreasing the temperature during the varying be relatively slow arises from an unexpected and herein reported necessity to ensure that there is little or no substantial temperature gradient inside the egg, a necessity that is in contrast to the inventors previous experience and in contrast with what happens in nature when an egg is turned by a brooding bird.

Thus, in some embodiments, the varying of the temperature of the atmosphere in the incubator is such that substantially no temperature gradient is formed in the eggs that are inside the incubation chamber. That said, in some embodiments, the varying of the temperature of the atmosphere in the incubator is such that only an insubstantial radial temperature gradient is formed in the eggs that are inside the incubation chamber Thus, in some embodiments, the varying of the temperature of the atmosphere in the incubator is such that substantially no temperature gradient is formed in the eggs that are inside the incubation chamber.

In some embodiments, the varying of the temperature of the atmosphere in the incubator is such that an insubstantial radial temperature gradient is formed in the eggs that are inside the incubation chamber (that is to say, the temperature of portions of egg-content close to the eggshell are substantially equal to the temperature of the atmosphere while the temperature of the portions of the egg content closer to the center of the egg are at a somewhat insubstantially different temperature).

Thus and as noted above, in some embodiments (e.g., especially when the incubating eggs are chicken eggs), the rate of the increasing the temperature of the atmosphere is not greater than 0.9°/5 minutes; and the rate of the reducing the temperature of the atmosphere is not greater than 0.9°/5 minutes. In some embodiments e.g., especially when the incubating eggs are chicken eggs), the rate of the increasing and the rate of decreasing the temperature of the atmosphere are not greater than 0.8°/5 minutes, not greater than 0.7°/5 minutes, not greater than 0.6°/5 minutes, not greater than 0.5°/5 minutes and in some embodiments even not greater than 0.4°/5 minutes.

Typically, the minimum rate of increasing and decreasing the temperature is determined by the minimal number of daily temperature varying events as well as the difference between the first, second and third temperatures. That said, in some embodiments, the rate of increasing and the rate of decreasing the temperature of the atmosphere are not less than 0.05°/5 minutes.

The above maximum heating and cooling rates have been found to be suitable for incubation of chicken eggs (typically weighing between 33 g and 75 g). It is possible that in some embodiments where substantially larger or smaller eggs are being incubated, the maximal heating and cooling rates may be adjusted.

In such embodiments, it is expected that the above-listed suitable heating and cooling rates are also suitable for the incubation of duck eggs (50 g-90 g).

In some such embodiments where the incubating eggs are substantially larger than chicken eggs, the maximal rates of increasing and decreasing the temperature of the atmosphere may preferably be slower than for chicken eggs, for example:

turkey eggs (66 g-120 g), in some embodiments the rates being not greater than 0.6°/5 min, not greater than 0.5°/5 min, not greater than 0.4°/5 min, and in some embodiments even not greater than 0.3°/5 min;

goose eggs (100 g-200 g), in some embodiments the rates being not greater than 0.5°/5 minutes, not greater than 0.4°/5 min, not greater than 0.3°/5 min, and in some embodiments even not greater than 0.2°/5 min; and for ostrich eggs (1000 g to 1300 g), in some embodiments the rates being not greater than 0.4°/5 min, not greater than 0.3°/5 min, not greater than 0.2°/5 min; and in some embodiments even not greater than 0.1°/5 minutes;

In some such embodiments where the incubating eggs are substantially smaller than chicken eggs, the maximal rates of increasing and decreasing the temperature of the atmosphere may preferably be faster than for chicken eggs, for example:

for pheasant eggs (~31 g), in some embodiments the rates being not greater than 0.0°/5 min, not greater than 0.9°/5 min and even, not greater than 0.8°/5 min;

for partridge eggs (typically weighing, 22 g), in some embodiments the rates being not greater than 1.1°/5 min, not greater than 1.0°/5 min and even not greater than 0.9°/5 min; and for pigeon and dove eggs (~14 g) and quail eggs (~9 g), in some embodiments the rates being not greater than 1.2°/5 min, not greater than 1.1°/5 min and even not greater than 1.0°/5 min.

In some embodiments, during the increasing of the temperature from the first to the second temperature, the rate of temperature increase is constant. Similarly, in some embodiments, during the decreasing of the temperature from the second to the third temperature, the rate of temperature decrease is constant.

In some embodiments, during the increasing of the temperature from the first to the second temperature, the rate of temperature increase varies, for example is sinusoidal or stepwise. Similarly, in some embodiments, during the decreasing of the temperature from the second to the third temperature, the rate of temperature decrease varies, for example is sinusoidal or stepwise.

That said, in order to preclude sudden changes in temperature, in some embodiments during the increasing of the temperature from the first to the second temperature and during the decreasing of the temperature from the second to the third temperature, there is no 5 minute period where the temperature changes by more than 1° C., with the exception of incidental higher rate that may occur during typical maintenance and/or handling/inspection of the eggs.

Humidity

As known to a person having ordinary skill in the art, as the temperature of a gas such as air varies, the relative humidity of the air changes at constant water content (i.e., in units of grams of water in kg air). For example, a kilogram of air with 20 grams of water has a relative humidity of 100% at 25° C. but only about 50% at 36° C. As a result, the rate of evaporation of water from eggs held in an incubator according to the teachings herein may dramatically vary as the temperature of the atmosphere in the incubation chamber varies unless methods are employed to adjust the relative humidity of the atmosphere during the variation of the temperature.

Analogously to the known in the art, in some embodiments the rate of actual weight loss of the eggs in the incubation chamber is monitored (typically by weighing a sample of eggs, once every other day) and the relative humidity of the atmosphere of the incubation chamber is changed (raising the relative humidity if the rate of weight loss is too high and lowering the relative humidity if the rate of weight loss is too low).

In some embodiments, no particular effort is made to ensure that the relative humidity of the atmosphere in the incubation chamber is maintained at a relatively constant level with the varying of the temperature of the atmosphere.

In some embodiments, the relative humidity of the atmosphere in the incubation chamber is maintained at a relatively constant level with the varying of the temperature of the atmosphere.

Accordingly, in some embodiments the method further comprises, during period of time of the incubating and with the varying of the temperature of the atmosphere in the incubation chamber, maintaining the relative humidity of the atmosphere within 50% of a predetermined desired relative humidity value, within 25%, within 15%, and even within 10% of a predetermined desired relative humidity value. For example, if a 60% relative humidity is desired, the humidity is maintained at: between 90% and 30% (in embodiments requiring 50% of a predetermined desired relative humidity value); between 75% and 45% (in embodiments requiring 25% of a predetermined desired relative humidity value), between 69% and 51% (in embodiments requiring 15% of a predetermined desired relative humidity value) and between 66% and 54% (in embodiments requiring 10% of a predetermined desired relative humidity value).

In some embodiments, a predetermined relative humidity value is maintained by directing air having the predetermined relative humidity value into the incubation chamber.

In some embodiments, the method further comprises, during the period of time of the incubating and with the varying of the temperature of the atmosphere in the incubation chamber, monitoring the relative humidity value of the atmosphere in the incubation chamber, and if the relative humidity is substantially different from a desired relative humidity value, changing the relative humidity of the atmosphere. In some embodiments, by "substantially different" is meant that the relative humidity of the atmosphere is within 50%, within 25%, within 15%, and in some embodiments within 10% of a predetermined desired relative humidity value.

The value of a desired relative humidity value is dependent on many factors that are known in the art and include the species of bird, the subspecies of bird (e.g., type of chicken) and also the composition of feed given to the laying hen that at least partially determines the eggshell thickness. The value of the predetermined desired relative humidity value is dependent also on the stage of incubation: typically the first part of the natural incubation period is at a lower relative humidity and near the end of the natural incubation period at a higher relative humidity. The determination of a desired relative humidity for a specific species/subspecies is typically done by trial-and-error experimentation Embodiments of the method for incubating avian eggs according to the teachings herein may be implemented using any suitable device. That said, some embodiments of the methods according to the teachings herein are advantageously implemented using an incubation device according to the teachings herein.

Incubation Device

Thus according to an aspect of some embodiments of the teachings herein, there is also provided an incubation device suitable for incubating avian eggs, comprising:
a, walls defining a closed incubation chamber;
b. a temperature-varying component configured to introduce air at a specified temperature into the incubation chamber to change the temperature of the atmosphere in the incubation chamber; and
c. an incubator controller, configured to output a command to the temperature-varying component to introduce air at a specified temperature into the incubation chamber so as to actively increase the temperature of the atmosphere inside the incubation chamber from a first temperature to a second temperature at a frequency of not less than five times a day, wherein a temperature difference between the first temperature and the second temperature is not less than 10° C.

The incubation chamber is of any suitable size as known in the art of incubators. Typically, the larger the incubation chamber, the greater the number of eggs that are potentially simultaneously incubated therein. In some embodiments, the incubation chamber has a volume of not less than about 1000 liter (e.g., a cubical chamber 100×100×100 cm).

That said, an incubation chamber according to the teachings herein is typically implemented as a room, in some embodiments having a volume of not less than about 8 m3 (e.g., a room 2 m×2 m, with a 2 m high ceiling) and in some embodiments a volume of not less than about 19 m3 (e.g., a room 3 m×3 m, with a 2 m high ceiling).

The walls of the incubation device are any suitable walls, for example the walls of a room or a box that serves as the incubation device. In some embodiments, the walls are insulated to reduce the influence of ambient (outside the device) temperature on the temperature inside the chamber, allowing the temperature of the atmosphere inside the incubation chamber to be more uniform, more accurately maintained with less fluctuation and allowing the temperature inside the chamber to be more economically and accurately varied in accordance with the teachings herein. Thus, in some embodiments, the incubation chamber is insulated to reduce the influence of ambient temperature on a temperature inside the incubation chamber. In some embodiments, the incubation chamber is sealed.

Temperature-Varying Component

As noted above, in some embodiments the device comprises a temperature-varying component configured to introduce air at a specified temperature into the incubation chamber to change the temperature of the atmosphere in the incubation chamber. In some embodiments the temperature-varying component is also configured to introduce air at a specified temperature into the incubation chamber to maintain the temperature of the atmosphere in the incubation chamber at the specified temperature. Suitable temperature-varying components include blowers functionally associated with coil heaters and air-conditioners that are configured to generate air having a specified temperature (within the ranges suitable for implementing the method according to the teachings herein), where in the device the temperature is specified at any moment by the incubator controller. In such a way, the temperature of the atmosphere inside the incubation chamber changes primarily through displacement of atmosphere having an undesired temperature with air having the desired temperature.

In some embodiments, the temperature-varying component is configured to introduce air having a specified temperature into the incubation chamber at a rate sufficient so that the temperature of the temperature of the atmosphere in the incubation chamber is substantially equal to the specified temperature in not more than 5 minutes, not more than 4 minutes, not more than 3 minutes, not more than 2 minutes, not more than 1 minute and in some embodiments even not more than 30 seconds. A person having ordinary skill in the art (for instance, in the art of air conditioning) is able to determine the exact configuration of a suitable such temperature-varying component for a given incubation chamber, and typically relies on configuration to generate and move a volume of air at the specified temperature that is relatively large in comparison to the volume of the incubation chamber.

Any suitable temperature-varying component can be used in implementing an incubating device according to the teachings herein. As discussed herein, in some embodiments it is preferred that the temperature in the incubation chamber be maintained or varied by introduction of air at a desired temperature into the incubation chamber (convection) as such a mechanism is less likely to yield temperature differences and gradients in the incubation chamber, or overheating as may occur using radiative heating. Accordingly, in some embodiments the temperature-varying component is configured to produce sufficient volumes of air at a specified temperature that are directed into the incubation chamber to change and/or maintain the temperature of the atmosphere in the incubation chamber in accordance with the commands of the incubator controller.

In some embodiments the temperature-varying component is a standard or customized air conditioner. An air conditioner is advantageous for implementing the teachings herein as an air conditioner can be configured to generate relatively large volumes of air at a desired temperature to cool or to heat the atmosphere of the incubation chamber and is relatively energy efficient. Additionally, an air conditioner can be configured to control the relative humidity of the hot or cool air generated, (see below, as well as the discussion of the method of the teachings herein).

Incubator Controller

As noted above, in some embodiments, an incubating device comprises an incubator controller, configured to output a command to the temperature-varying component to introduce air at a specified temperature into the incubation chamber so as to actively increase the temperature of the atmosphere inside the incubation chamber from a first temperature to a second temperature (higher than the first temperature) at a frequency of not less than five times a day, wherein a temperature difference between the first temperature and the second temperature is not less than 1.0° C.

Any suitable incubator controller may be used in implementing the teachings herein, for example, any suitable mechanical, electronic or digital component or combination of components or assembly. In some embodiments, the incubator controller comprises a microprocessor and associated commands (as hardware, firmware, software or combination thereof), for example comprises a general purpose or custom computer.

The incubator controller is typically suitable for varying and controlling the temperature in accordance with at least one embodiment of the method of incubation as described above. For example, such embodiments of the device are useful, inter al/a, for implementing embodiments of the method according to the teachings herein that include active heating and passive cooling.

In some embodiments, the incubator controller is suitable for varying and controlling the temperature in accordance with at least two embodiments of the method of incubation as described above, and is configured to allow an operator to select which of the at least two embodiments of the method of incubation is to be implemented. In some embodiments, the incubator controller is programmable, allowing a user to change the parameters of the incubation by the associated incubation device, for example to implement one or more embodiments of the method of incubation as described above.

For use, the incubator controller is activated (optionally, subsequent to selection or programming). When required, and at a frequency of not less than five times a day, the incubator controller outputs a command to the associated temperature-varying component to introduce air into the incubation chamber, thereby actively increasing the temperature of the atmosphere in the incubator from a first temperature to a second temperature (higher than the first temperature), wherein the temperature difference between the first temperature and the second temperature is not less than 1.0° C.

Device Configured for Active Cooling

As noted above, some embodiments of an incubation device according to the teachings herein are configured to actively increase the temperature of the atmosphere inside the incubation chamber. In some embodiments, an incubation device is also configured to actively decrease the temperature of the atmosphere inside the incubation chamber. For example, such embodiments of the device are useful, inter alia, for implementing embodiments of the method according to the teachings herein that include active heating and active cooling.

Accordingly, in some embodiments the incubator controller is further configured to output a command to the temperature-varying component to introduce air at a temperature into the incubation chamber so as to actively decrease the temperature of the atmosphere inside the incubation chamber from a second temperature to a third temperature lower than the second temperature at a frequency of not less than five times a day, wherein a temperature difference between the second temperature and the third temperature is not less than 1.0° C.

In such embodiments, the incubator controller is activated (optionally, subsequent to selection or programming). As discussed above, when required, the incubator controller outputs a command to the associated temperature-varying component to actively increase the temperature of the atmosphere in the incubator from a first temperature to a higher second temperature. Additionally, when required and at a frequency of not less than five times a day, the incubator controller outputs a command to the associated temperature-varying component to introduce air having a lower temperature into the incubation chamber, thereby actively decreasing the temperature of the atmosphere in the incubator from the second temperature to a third temperature lower than the second temperature, wherein the temperature difference between the second temperature and the third temperature is not less than 1.0° C.

Temperature Sensor

As noted above, during use of the device, the incubator controller typically outputs a command to the temperature-varying component to actively increase the temperature of the atmosphere inside the incubation chamber when required. Further, in some embodiments the incubator controller outputs a command to the temperature-varying component to actively decrease the temperature of the atmosphere inside the incubation chamber when required. The determination of when it is required to actively increase or decrease the temperature may be done in any suitable manner. In some embodiments, the determination is performed with reference to the temperature of the atmosphere inside the incubation chamber as determined by a temperature sensor.

In some embodiments, an incubation device according to the teachings herein further comprises a temperature sensor configured to determine the temperature of the atmosphere inside the incubation chamber, and to provide the determined temperature to the incubator controller.

Any suitable temperature sensor can be used in implementing a device according to the teachings herein, for example a thermometer. In some embodiments, the temperature sensor is configured to determine the temperature at a temperature-determining rate of not slower than once every minute, not slower than once every 30 seconds, and even not slower than once every 15 seconds. In some embodiments, the temperature sensor is configured to determine the temperature of the atmosphere in the incubation chamber to an accuracy of not better than ±0.5°, not better than ±0.4°, not better than ±0.3° and in some embodiments even not better than about ±0.2°.

In some embodiments, a device according to the teachings herein is devoid of a temperature sensor to determine the temperature of the atmosphere in the incubation chamber, although in such embodiments, the temperature-varying component typically includes a temperature sensor to determine the temperature of the air that the temperature-varying component introduces into the incubation chamber.

Active Heating with Reference to a Temperature Sensor

In some such embodiments, the incubator controller is further configured so that: if the temperature received from the temperature controller is below a lower temperature limit, to output a command to the temperature-varying component to introduce air at a specified temperature into the incubation chamber so as to actively increase the temperature of the atmosphere inside the incubation chamber to a second temperature, wherein a temperature difference between the second temperature and the lower temperature limit is not less than 1.0° C.

Passive Cooling and Active Heating with Reference to a Temperature Sensor

Some such embodiments allow implementation of embodiments that include active heating and passive cooling of the atmosphere in the incubation chamber. Accordingly, in some embodiments the incubator controller is further configured so that: if the temperature received from the temperature controller is above a upper temperature limit, to output a command to the temperature-varying component to stop the introduction of air into the incubator chamber by the temperature-varying component, allowing the temperature of the atmosphere inside the incubation chamber to passively cool (assuming the ambient temperature is appropriate) through heat exchange (through any mechanism including conduction, convection and/or radiation) with the ambient atmosphere.

Active Cooling and Heating with Reference to a Temperature Sensor

Some such embodiments allow implementation of embodiments that include active heating and active cooling of the atmosphere in the incubation chamber. Accordingly, in some embodiments the incubator controller is further configured so that: if the temperature received from the temperature controller is above an upper temperature limit, to output a command to the temperature-varying component to introduce air at a specified temperature into the incubation chamber so as to actively decrease the temperature of the atmosphere inside the incubation chamber to a third temperature, wherein a temperature difference between the third temperature and the upper temperature limit is not less than 1.0° C.

Rack Holder, Egg Mover and Egg Racks

In some embodiments, a device according to the teachings herein further comprises: inside the incubation chamber, a rack holder configured to support at least one egg rack; and an egg mover, configured to change an orientation of eggs held in an egg rack supported by the rack holder.

Any suitable egg rack, rack holder and egg mover combination, for example such as known in the art of incubators, may be used in implementing the teachings herein.

Typically, the egg mover is a mechanical component or assembly that includes hinges, bars, pivots, springs, levers and/or one or more motors.

In some embodiments, a rack holder and an egg mover are not physically associated, for example, the egg mover is an egg-clamp configured to clamp an egg, lift the clamped egg from the egg rack and change the orientation of the egg.

In some embodiments, a rack holder and an egg mover are physically associated, for example, rails functioning as a rack holder are physically associated with a mechanism for repeatedly moving the rails up and down in a vertical direction functioning as an egg mover to effect tilting of eggs held in egg racks supported by the rails.

In some embodiments, the egg mover is configured to change an orientation of eggs held in an egg rack supported by a rack holder by tilting the rack holder back and forth through an arc of not less than about 20°, not less than about 40°, not less than about 60°, and even not less than about 90°.

In some embodiments, the egg mover is configured to change an orientation of eggs held in an egg rack supported by a rack holder by rotating the eggs around the axis of the eggs. In some such embodiments, the egg mover functions through a component of the rack holder and/or egg rack to effect the change of rotation (for example, rotating a mechanism of the rack holder that rotates rollers on which held eggs are held on the egg rack). In some such embodiments, the egg mover functions through a component of the egg rack without a component of the rack holder to effect the change of rotation (for example, rotating rollers on which held eggs are held on the egg rack). In some such embodiments, the egg mover changes the orientation of the eggs directly, for example, by rotating the eggs with a rotating component.

In some embodiments, an egg rack and rack holder are a single unified component.

In some embodiments, an egg rack and rack holder are separate components, allowing simpler placement of eggs in the egg racks, and simpler washing of the egg racks when required.

In some embodiments, the device further comprises at least one egg rack configured to hold a plurality of avian eggs for incubation. Suitable egg racks include egg racks known in the art and are typically of metal or plastic and preferably do not insulate substantially portions of eggs held therein from contact with the atmosphere. In some embodiments, an egg rack is configured to hold a plurality of avian eggs of at least one species of bird selected from the group consisting of chicken, turkey, goose, duck, pheasant, quail, pigeon (including doves), partridge and ostrich. In some embodiments, a device comprises at least two egg racks, each one of the two egg racks configured to hold the same type of avian egg. In some embodiments, a device comprises at least two egg racks, each one of the two egg racks configured to hold a different type of avian egg.

Egg-Mover Actuator

In some embodiments, the incubation device further comprises an egg-mover actuator functionally-associated with the egg-mover, configured, when activated, to actuate the egg mover to change an orientation of eggs held in an egg rack supported by the rack holder at a frequency of not less than once every two days.

In typical embodiments, the egg-mover actuator comprises a timing mechanism and optionally a switch. For example, in some embodiments, the egg-mover actuator comprises a mechanical or electrical timer that is preset to activate an electrical motor of an egg-mover at desired times. In some embodiments, the egg-mover actuator comprises a microprocessor and associated commands as hardware, firmware, software or combination thereof), for instance, a general-purpose computer or a custom-made computer. In some embodiments at least a portion of the incubator controller is some, if not all, of the egg-mover actuator.

In some embodiments, the egg-mover actuator is configured to actuate the egg-mover discontinuously, in some embodiments, according to the parameters described above with reference to the method of incubating eggs according to the teachings herein.

In some embodiments, the egg-mover actuator is configured to actuate the egg-mover continuously, in some embodiments, according to the parameters described above with reference to the method of incubating eggs according to the teachings herein.

Humidity Sensor, Humidity Controller and Humidifier/Dehumidifier

As discussed with reference to the method of incubation according to the teachings herein, in some embodiments it is advantageous to control the relative humidity of the atmosphere inside the incubation chamber. Control of the relative humidity is exceptionally challenging when implementing the teachings herein as relative humidity changes significantly with varying temperature.

Accordingly, in some embodiments, an incubation device further comprises a humidity sensor functionally associated with the incubation chamber, configured to determine the relative humidity of the atmosphere in the incubation chamber, in some embodiments to an accuracy better than about ±25%, better than about ±15%, better than about ±10% and in some embodiments better than about ±5%. Any suitable commercially-available humidity sensor may be used in implementing the teachings herein. In some embodiments, the humidity sensor is a component of the temperature-varying component.

In some embodiments, an incubation device further comprises a humidifier/dehumidifier functionally associated with the incubation chamber, configured to maintain the relative humidity of the atmosphere inside the incubation chamber within 50%, within 25%, within 15% and in some embodiments within 5% of a desired relative humidity value. Any suitable commercially-available humidifier/dehumidifier may be used in implementing the teachings herein. In some embodiments, the humidifier/dehumidifier is a component of the temperature-varying component.

In some embodiments, an incubation device further comprises a humidity controller, configured to:

i. receive a measure of a relative humidity of the atmosphere inside the incubation chamber determined by a functionally-associated humidity sensor and compare a determined relative humidity to a desired relative humidity value; and ii. if the determined relative humidity is substantially different from the specified relative humidity, to output a command to a humidifier/dehumidifier functionally associated with the incubation chamber to change the humidity of the atmosphere inside the incubation chamber to be closer to the specified relative humidity. In some embodiments, an incubation device further comprises a humidity sensor (as described above) functionally-associated with the humidity controller. In some embodiments, an incubation device further comprises a humidifier/dehumidifier as described above) functionally-associated with the humidity controller.

In some embodiments, the desired relative humidity value of the humidifier controller can be set by a user, for example, to a predetermined value that is dependent on the type of eggs being incubated such as the species of bird, the subspecies of bird, the composition of feed given to the laying hen and the stage of incubation.

In some embodiments, the humidity controller is programmable, allowing the desired relative humidity value to automatically change, for example as a function of the stage of incubation.

In some embodiments, the humidity controller is a component distinct from the incubator controller. In some embodiments, the humidity controller is a component of the incubator controller.

An embodiment of an incubation device according to the teachings herein suitable for implementing embodiments of the method according to the teachings herein, device 10 is schematically depicted in FIG. 1.

Device 10 includes a closed incubation chamber 12 (2 m×2 m×2 m, having a volume of 8 m$^3$) defined by insulated walls 14. In FIG. 1, are depicted five walls, while the (sixth) front wall is not depicted for clarity. The not-depicted front wall constitutes a door that opens and closes by rotation around hinges 16. A small-diameter air vent 18 penetrates right wall 14a, providing fluid communication between incubation chamber 12 and ambient.

Inside incubation chamber 12 are three rack holders 20 secured through a first end to right wall 14a through a hinge 22 and through a second end to worm screw 24 via a traveling nut 26 connected to a rack holder 20 through a hinge 28.

Depicted supported on uppermost of rack holders 20 is egg rack 30 holding eggs 32.

Worm screw 24, together with hinges 22 and 28, traveling nuts 26 and electric motor 36 constitute an egg mover 34 of device 10.

Resting on top wall 14b are incubator controller 38 (a general purpose computer loaded with required software and hardware) and temperature-varying component 40 (a humidity-controlling air-conditioner) with water reservoir 42.

A temperature sensor 44 is configured to determine the temperature of the atmosphere in incubation chamber 12 and is functionally associated with incubator controller 38.

Humidity sensor 46, configured to determine the relative humidity of the atmosphere in incubation chamber 12, is functionally associated with incubator controller 38.

For use, a user programs (e.g., uploads) incubator controller 38 with parameters required to implement an embodiment of the method according to the teachings herein, including a egg-orientation changing protocol, a desired relative humidity value and a temperature-varying protocol in accordance with an embodiment of the method according to the teachings herein.

Eggs 32 are placed in incubation chamber 12 to be held in egg racks 30, and egg racks 30 are supported by rack holders 20 and incubator controller 38 is activated.

According to the programmed egg-orientation changing protocol, incubator controller 38 activates electrical motor 36 of egg mover 34 to rotate worm screw 24 at a required direction, rate. duration and frequency. Rotation of worm screw 24 causes traveling nuts 26 to rise or fall, depending on the direction of rotation of worm screw 24, thereby lifting one end of rack holders 20 through hinges 28, so that rack holders 20 tilt by rotation around hinges 22 back and forth through an arc of about 20°. Tilting of rack holders 20 leads to the desired change of orientation of eggs 32 held in egg racks 30 supported by rack holders 20.

Incubator controller 38 activates temperature-varying component 40 in the usual way of air conditioners by introducing large volumes (relative to the size of incubation chamber 12) of air into incubation chamber 12, the air at a temperature dictated by incubator controller 38 so that the temperature of the atmosphere of the incubator chamber is equal to the temperature of the introduced air within 30 seconds of a change being made. Incubator controller 38 outputs commands to temperature-varying component 40 to vary or maintain the temperature of the introduced air and consequently of the temperature of the atmosphere inside the incubation chamber 12 in accordance with the programmed temperature-varying protocol. Excess air escapes incubation chamber 12 through vent 18.

Incubator controller 38 receives the actual temperature of the atmosphere in incubation chamber 12 as determined by temperature sensor 44 and compares the determined temperature to the temperature required by the programmed temperature-varying protocol for that moment. In embodiments where the programmed temperature-varying protocol includes passive cooling, when the temperature received by incubator controller 38 is below a minimum temperature limit, incubator controller 38 outputs a command to temperature-varying component 40 to introduce warmer air as required by the temperature-varying protocol.

Concurrently and in the usual way of humidifying air conditioners, incubator controller 38 receives the relative humidity of the atmosphere in incubation chamber 12 determined by humidity sensor 46 and compares the determined relative humidity to the desired relative humidity. If the determined relative humidity is substantially different from the desired relative humidity, incubator controller 38 outputs a command to temperature-varying component 40 that functions as a humidifier to change the relative humidity to be closer to the desired relative humidity.

Figure 2:
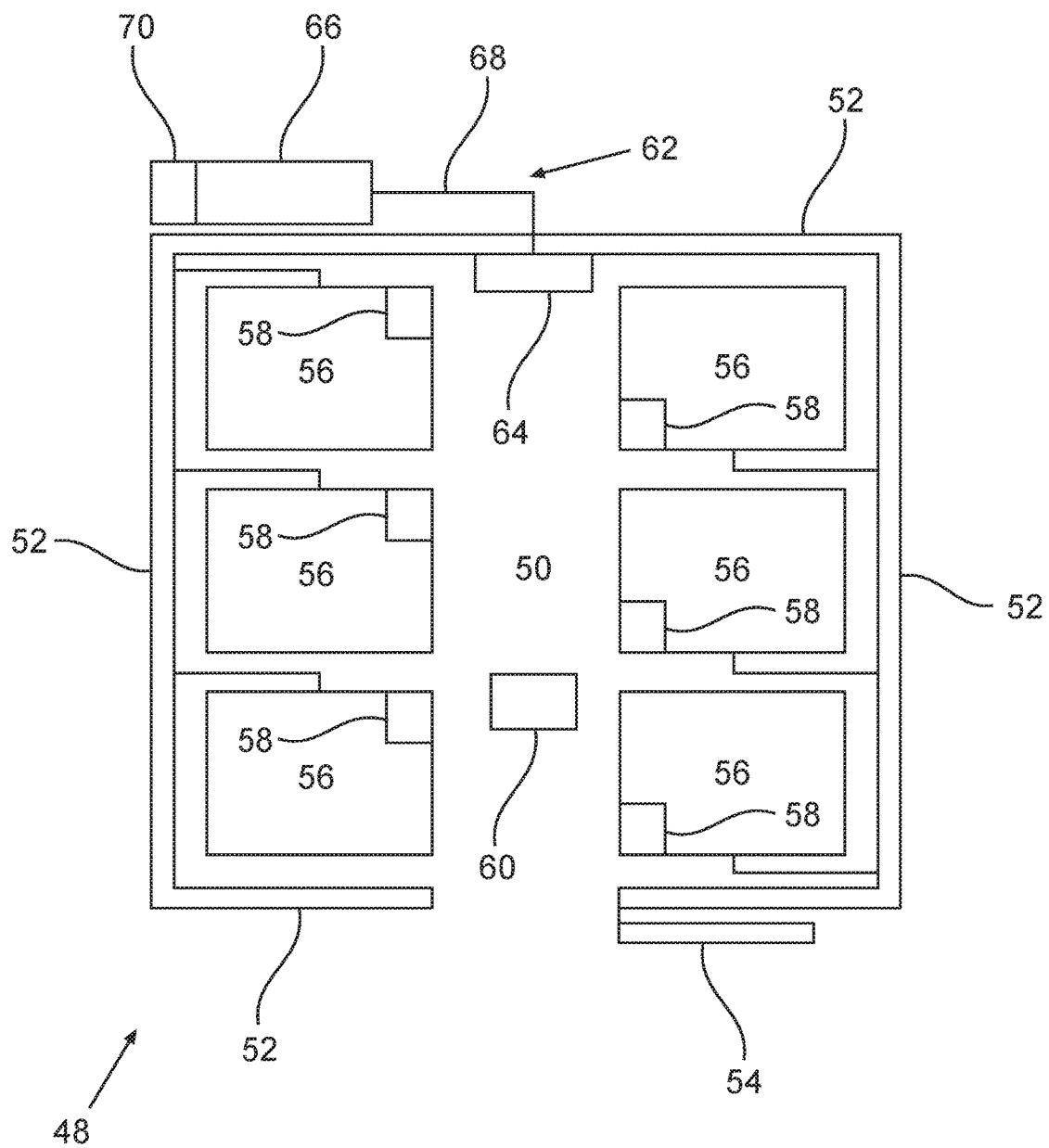
FIG. 2 schematically depicts a second embodiment of an incubating device according to the teachings herein, in top view.

A second embodiment of an incubation device according to the teachings herein suitable for implementing embodiments of the method according to the teachings herein, device 48, is schematically depicted in top view in FIG. 2.

Incubation chamber 50 of device 48 is substantially a room (5.5 m×4 m with a 2.5 m high ceiling) defined by four walls 52 and a ceiling (not depicted), with a door 54 providing access through one of the walls 52.

Inside incubation chamber 50 are six egg-rack holding trolleys 56, each trolley 56 being 1 m deep×150 cm wide×2 m high and having a stack of 15 tiltable rack holders (not depicted). Each trolley 56 includes an integrated egg mover 58 comprising an electrical motor functionally associated with a tilting mechanism and a timer allowing independent control of the movement of egg trays held in each trolley 56. The electrical motor of each trolley 56 receives electrical power from a standard electrical plug in a wall through an electrical cable.

Inside incubation chamber 50 is an independently operable air humidifier 60.

Located across one of walls 52 is a temperature-varying component 62 (a ductless (split) air-conditioner) having an indoor unit 64 (with heat exchanger and blower), an outdoor unit 66 (with compressor) functionally associated through fluid conduits 68.

An additional component of temperature-varying component 62 is incubator controller 70 (a modified programmable air conditioner controller).

For use, a user places egg racks holding eggs to be supported by rack holders of the six egg-rack holding trolleys 56. A user activates the timers of each of the six egg-rack holding trolleys 56 to tilt the egg racks (continuously or discontinuously) to a desired degree at a desired frequency (i.e., an egg-orientation changing protocol). A user activates air humidifier 60 to maintain the air at a desired relative humidity value according to experience.

A user programs and activates incubator controller 70 with a desired temperature-varying protocol. Incubator controller 70 activates temperature-varying component 62 in the usual way to vary and maintain the temperature of the atmosphere in chamber 50 in accordance with the temperature-varying protocol.

EXPERIMENTAL

Incubation Device

An incubation device was made from commercially-available hollow PVC panels, each panel being 1.8 mm thick and comprising two parallel walls of 1.5 mm thick PVC separated by 0.15 mm and mutually connected by 1 mm thick perpendicular ribs, thereby forming a 1.5 mm air-filled insulating volume between the two parallel walls. Specifically five panels (top, bottom, back, left and right panels) were assembled to form an open-front box defining an incubation chamber 45 cm wide, 45 cm deep and 70 cm high. The front-facing edges of the PVC panels of the open front of the box were lined with 4 mm thick foam rubber insulation. Four 10 cm-high PVC legs were attached to the outside of the bottom panel.

A 6 mm plexiglass panel was attached to the open front of the box with three hinges, constituting a door, that was held in a closed state pressed against the foam rubber insulation with the use of a hook and eyelet.

A self-made psychrometer-type humidity sensor was attached to the door facing so as to be readable from outside the incubation chamber without necessitating opening the door.

Two heating assemblies were attached inside the incubation chamber to the left panel, one above the other. Each heating assembly comprised a square plate 30 cm×30 cm of 5 mm thick aluminum, offset 5 cm from the inside wall of the left panel by four bolts, the aluminum plates having a 10 cm diameter hole in the center. Secured to and contacting the inner face of each aluminum plate (the side facing the left PVC panel) was a 220V/165 W heating coil. Secured to the aluminum plates and covering the 10 cm diameter hole were 12V/8.6 W fans. The power cables for the two fans and the two heating coils passed along the left panel inside the incubation chamber to pass through a small hole in the top panel. When power was fed to the fans and the heating coils, the heating coils heated the surrounding air and the aluminum plates. The fans pulled air through the hole in the aluminum plate towards the middle of the incubator chamber, so that air from the incubator chamber was drawn through the volume between the left panel and the aluminum plate to be heated, before being expelled by the fan.

The sensor of a digital thermometer was secured to the inside of the right panel with a a data cable passing along the right panel inside the incubation chamber to pass through a small hole in the top panel.

A self-made incubator programmable controller was secured to the top panel, and functionally-associated with the data cable of the digital thermometer and the power cables for the heating assemblies.

A 5 cm deep, 20 cm broad and 5 cm deep polyethylene tray was placed at the bottom of the incubation chamber as a water basin and filled to 3 cm deep with water.

Four polyethylene egg racks, each egg rack configured to hold 30 eggs, were held one above the other in a rack holder located inside the incubation chamber, the rack holders configured to tilt at an angle from −45° to 45°. Tilting was performed by activation of the tilting mechanism, an electrical motor connected to a reduction gear and crank assembly. The electrical motor, reduction gear and upper end of the crank were located on the outside of the top panel.

Incubation 120 fertilized chicken eggs (all weighing between 45-65 g) were acquired from an egg farm in the Sharon region of Israel that reported an 88% hatching rate using the same type of eggs incubated in an industrial incubator maintained at a constant 37.5±0.1° C.

Incubation in the incubator was performed for an incubation period of 21 days in accordance with an embodiment of the teachings herein. When required, water was added to the water basin.

During the 21 days incubation, the tilting mechanism was activated so that the egg racks were continuously tilted through a 90° arc (−45° to +45°), the period of tilting being 1.5 hours, so the eggs were tilted from a first extreme (−45°) to a second extreme (+45°) and back to the first extreme 18 times a day. Tilting was stopped only when required for examining the eggs.

During the 21 days incubation, the incubator controller was operated to cyclically activate the two heating assemblies with a 90 minute period (18 cycles per day) thereby varying the temperature of the atmosphere in the incubator chamber. In each such cycle:

a. for a first 15 minute rest period, the heating assemblies were activated to heat the atmosphere only as long as the digital thermometer measured a temperature lower than a limit of 35.5° C.;

b. following 'a', for a period of 30 minutes the heating assemblies were activated to heat the atmosphere only as long as the digital thermometer measured a temperature lower than a limit, the limit being 35.5° C.+t/30*3° C., t being a time in minutes. In such a way, the limit increased at a rate of 1° C./10 min, and after 30 minutes the limit reached 38.5° C.;

c. following 'b', for a second 15 minute rest period, the heating assemblies were activated to heat the atmosphere only as long as the digital thermometer measured a temperature lower than a limit of 38.5° C.'; and d. following 'c', for a period of 30 minutes the heating assemblies were activated to heat the atmosphere only as long as the digital thermometer measured a temperature lower than a limit, the limit being 35.5° C. During this period, the atmosphere cooled passively.

A number of times during the incubation period, the actual temperature of the atmosphere of the incubator as measured by the digital thermometer was manually recorded, every 5 minutes for 180 minutes. It was found that the actual atmosphere temperature in the incubator chamber varied between a first (lower) temperature of 35.5±0.1° C. and a second (higher) temperature of 38.5±0.1° C. in a substantially cyclically sinusoidal-type manner with little or no period of constant temperature at the lower or the higher temperature (i.e., during the "rest periods"). It was found that both the active heating and passive cooling serendipitously proceeded at substantially the same rate, both varying between 0.33° and 0.4°/5 minutes.

Throughout the 21 days incubation period, the ambient temperature was monitored and found to be 22°±2° C. and the relative humidity inside the incubation chamber as measured by the humidity sensor remained at 55%.

At day 7, the tilting and incubator controller were stopped, and all eggs were weighed and examined in the usual way. 2 of the 120 eggs were found to be infertile and were discarded. The weight loss of the remaining 118 eggs was found to be normal and indicative of normal development of chicken eggs.

At day 14, the tilting and incubator controller were stopped, and 8 eggs from each one of the four racks was weighed in the usual way. The weight loss of the 32 weighed eggs was found to be normal and indicative of normal development of chicken eggs.

At day 21, the beginning of the hatching process was observed. The tilting was stopped. 116 of the 118 eggs hatched and all 116 of the hatched chicks were free of birth defects and survived at least 1 week, corresponding to a 98.3% hatching rate (of the 118 fertile eggs) and a 100% viability rate. Such a high hatching rate is far superior to the 88% hatching rate reported by the egg farm that supplied the eggs.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method for incubating avian eggs, comprising:
   a. introducing avian eggs into an incubation chamber having an oxygen-containing atmosphere;
   b. subsequent to 'a', incubating said eggs in said incubation chamber for a period of time that is not less than 25% of the natural incubation period of said eggs;
   c. during said period of time of the incubating, changing an orientation of said eggs at a frequency of not less than once every two days; and
   d. during said period of time of said incubating, varying a temperature of said atmosphere in said incubation chamber at a frequency of not less than five times a day, the varying comprising:
      increasing the temperature of the atmosphere from a first temperature to a second temperature, the difference between the first temperature and the second temperature being not less than 1.0° C.; and subsequently
      reducing the temperature from the second temperature to a third temperature, the difference between the second temperature and the third temperature being not less than 1.0° C.
   wherein the rate of said increasing the temperature of the atmosphere is not greater than 0.9° C./5 minutes;
   wherein said reducing of said second temperature to said third temperature commences after a period of at least one minute subsequent to attaining said second temperature; and the rate of said reducing the temperature of the atmosphere is not greater than 0.9° C./5 minutes.

2. The method of claim 1, wherein the avian eggs are of a species of bird selected from the group consisting of chicken, turkey, goose, duck, pheasant, quail, pigeon, partridge, dove and ostrich.

3. The method of claim 1, wherein the avian eggs are chicken eggs.

4. The method of claim 1, wherein said temperature difference between said first temperature and said second temperature is not less than 1.5° C.

5. The method of claim 1, wherein said temperature difference between said first temperature and said second temperature is not more than 5° C.

6. The method of claim 1, wherein said temperature difference between said first temperature and said second temperature is not more than 4° C.

7. The method of claim 1, wherein said second temperature is not less than 37° C.

8. The method of claim 1, wherein said first temperature is not greater than 37° C.

9. The method of claim 1, wherein said varying of said temperature of said atmosphere is at a frequency of not less than ten times a day and not more than twenty-four times a day.

10. The method of claim 1, wherein the rate of said increasing the temperature of the atmosphere is not greater than 0.8° C./5 minutes; and the rate of said reducing the temperature of the atmosphere is not greater than 0.8° C./5 minutes.

11. The method of claim 1, wherein the rate of said increasing the temperature of the atmosphere is not greater than 0.7° C./5 minutes; and the rate of said reducing the temperature of the atmosphere is not greater than 0.7° C./5 minutes.

12. The method of claim 1, wherein the rate of said increasing the temperature of the atmosphere is not greater than 0.6° C./5 minutes; and the rate of said reducing the temperature of the atmosphere is not greater than 0.6° C./5 minutes.

13. The method of claim 1, wherein the rate of said increasing the temperature of the atmosphere is not greater than 0.5° C./5 minutes; and the rate of said reducing the temperature of the atmosphere is not greater than 0.5° C./5 minutes.

* * * * *